US012718401B2

(12) United States Patent
Froom

(10) Patent No.: US 12,718,401 B2
(45) Date of Patent: Aug. 25, 2026

(54) LIDAR MAPPING

(71) Applicant: Five AI Limited, Bristol (GB)

(72) Inventor: William Froom, Bristol (GB)

(73) Assignee: Five AI Limited, Cambridge (GB)

( * ) Notice: Subject to any disclaimer, the term of this patent is extended or adjusted under 35 U.S.C. 154(b) by 602 days.

(21) Appl. No.: 18/011,108

(22) PCT Filed: Jul. 2, 2021

(86) PCT No.: PCT/EP2021/068389
§ 371 (c)(1),
(2) Date: Dec. 16, 2022

(87) PCT Pub. No.: WO2022/003179
PCT Pub. Date: Jan. 6, 2022

(65) Prior Publication Data

US 2023/0162392 A1 May 25, 2023

(30) Foreign Application Priority Data

Jul. 3, 2020 (GB) ..................................... 2010245

(51) Int. Cl.
*G06T 7/73* (2017.01)

(52) U.S. Cl.
CPC ...... *G06T 7/74* (2017.01); *G06T 2207/10028* (2013.01); *G06T 2207/30244* (2013.01)

(58) Field of Classification Search
CPC ............. G06T 7/74; G06T 2207/10028; G06T 2207/30244; G01C 21/165;
(Continued)

(56) References Cited

U.S. PATENT DOCUMENTS

2017/0123066 A1* 5/2017 Coddington ............ G01S 17/50
2018/0074176 A1* 3/2018 Feng ....................... G01S 17/89
(Continued)

FOREIGN PATENT DOCUMENTS

CN 110223379 A 9/2019
CN 110689622 A 1/2020

OTHER PUBLICATIONS

PCT/EP2021/068389, International Search Report, By: Authorized Officer: Lopez De Valle, J., Date: Oct. 7, 2021.
(Continued)

*Primary Examiner* — Ellis B. Ramirez
(74) *Attorney, Agent, or Firm* — Andrew J. Tibbetts; Greenberg Traurig, LLP

(57) ABSTRACT

Systems and method for updating an accumulated 3D map are disclosed. A current point cloud is received, which is an untwisted lidar point cloud captured over a current interval, each point in the current point cloud associated with feature data indicating a feature type of each point of the current point cloud. Respective subsets of the current point cloud are provided to a plurality of processing threads, wherein each processing thread operates on its point cloud subset in parallel with the other processing thread(s) to perform the following mapping operations: compare each point of its point cloud subset with features of the accumulated 3D map to identify a corresponding feature of the same feature type in the accumulated 3D map, compute a distance between each point of its subset and the corresponding feature in the accumulated point cloud, and determine a derivative of each distance with respect to lidar pose change. The derivatives computed by the plurality of processing threads are used to: (i) calculate a refined pose change estimate over the current time interval, and (ii) augment the accumulated 3D map with
(Continued)

the untwisted current point cloud using the refined pose change estimate.

20 Claims, 2 Drawing Sheets

(58) Field of Classification Search
CPC ............ G01C 21/1652; G01C 21/1656; G01C 21/3848; G01S 7/4808; G01S 17/86; G01S 17/89; G01S 17/931
USPC ......... 700/253; 702/150, 153; 701/409, 450, 701/460; 348/94
See application file for complete search history.

(56) References Cited

U.S. PATENT DOCUMENTS

2018/0075643 A1* 3/2018 Sequeira ................. G06T 7/579
2019/0003836 A1* 1/2019 Zhang ................ G01C 21/3848
2019/0346271 A1 11/2019 Zhang
2020/0096317 A1* 3/2020 Nakazato ............... G01B 11/03
2020/0234491 A1* 7/2020 Pöyhtäri ................. G06T 17/00
2020/0284590 A1* 9/2020 Chen .................. G01C 21/3841
2021/0063200 A1* 3/2021 Kroepfl ................. G01S 13/931

OTHER PUBLICATIONS

Zhang Ji et al, “Low-drift and real-time lidar odometry and mapping”, Feb. 18, 2016 (Feb. 18, 2016), vol. 41, No. 2, p. 401-416.

* cited by examiner

Figure 2:
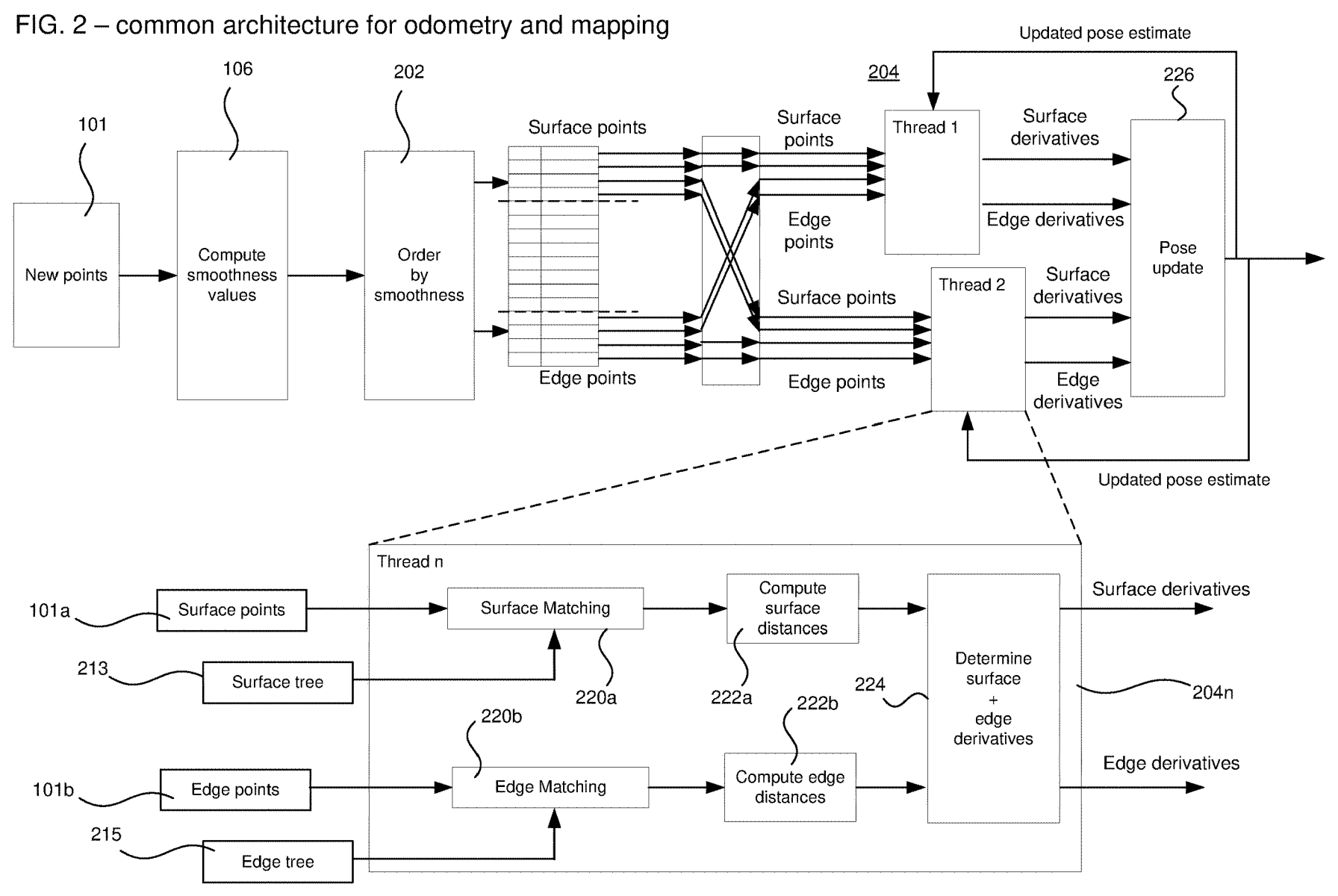

FIG. 2 – common architecture for odometry and mapping

101 New points

106 Compute smoothness values

202 Order by smoothness

Surface points

Edge points

204

Thread 1

Thread 2

Surface points

Edge points

Surface derivatives

Edge derivatives

226 Pose update

Updated pose estimate

Thread n

101a Surface points

213 Surface tree

101b Edge points

215 Edge tree

220a Surface Matching

220b Edge Matching

222a Compute surface distances

222b Compute edge distances

224 Determine surface + edge derivatives

204n

Surface derivatives

Edge derivatives

LIDAR MAPPING

CROSS-REFERENCE TO RELATED APPLICATIONS

This application is the U.S. National Stage application, pursuant to 35 U.S.C. § 371, of PCT International Patent Application No. PCT/EP2021/068389, filed Jul. 2, 2021, designating the United States and published in English, which claims priority under 35 U.S.C. §§ 119 and 365 to Great Britain Patent Application No. 2010245.5, filed Jul. 3, 2020. The contents of each of the aforementioned applications are incorporated herein by reference in their entirety.

TECHNICAL FIELD

The present disclosure pertains to lidar mapping.

BACKGROUND

Various techniques exist for sensing 3D structure. Lidar uses a scanning laser beam to capture high-resolution 3D point cloud data by measuring reflection of the laser beam from surrounding structure. A “scan line” refers to a line traced by the laser beam in one scan. In addition to laser scanning, certain forms of lidar scanner also rotate the scanner in a direction perpendicular to the scan plane of the lidar, extending the spatial coverage of the lidar scanner. This may be referred to as “sweeping”. The sweeping is a periodic motion, which typically occurs on a longer time scale than the scanning. For example, the scanning may be performed at a frequency of the order of 10s or 100s of scans/lines per second, with a single sweep having a duration of the order of one second. As will be appreciate, these numbers are merely illustrative and could vary significantly for different lidar scanners. Alternatively or additionally, the spatial coverage can be extended with multiple lidar channels (i.e. multiple scanning laser beams in parallel). This may be referred to as multi-channel lidar.

Two important concepts in lidar technology are untwisting and registration. Untwisting means transforming a 3D point cloud captured over some interval of time (e.g. over the course of one or multiple scans) to counteract ego motion effects. This may be synonymously referred to as projecting a (relatively distorted/twisted) point cloud to a particular time instant (the projected point cloud being a relatively undistorted or untwisted point cloud). Registration means transforming a 3D point to some desired coordinate system (or frame of reference), such as some defined world coordinates W (the map frame of reference).

Lidar mapping means the accumulation of lidar point cloud data over time, to build a 3D map of a region from which the data was captured. Lidar mapping using point cloud data from a moving lidar scanner (the lidar) is a particular challenge as the motion of the lidar scanner must be accounted for. Untwisting and registration are important in this context. Note, movement in this context means external motion within an environment (so called ego motion), above and beyond the internal kinematics of the lidar scanner.

Lidar mapping with a moving lidar scanner may operate as follows. Over the course of each individual sweep (k), a “component” point cloud ($P_k$) is captured. The component point cloud is then untwisted, to account for motion over the course of that sweep, and then transformed to the map frame of reference (registration). Over the course of multiple sweeps, this results in the accumulation of multiple, motion-compensated component point clouds in the same map frame of reference. An accumulated point cloud obtained by registering multiple component point clouds in a common world coordinate system is one example of an accumulated 3D map.

Lidar mapping with a moving scanner is a hard problem. To date, most mapping algorithms require offline (non-real time) batch processing to produce high quality lidar maps.

When it comes to real-time mapping, Zhang, J. & Sankiv, S., Low-drift and Real-time Lidar Odometry and Mapping (2017), DOI: 10.1007/s10514-016-9548-2 (“Zhang”), incorporated herein by reference in its entirety, teaches a method for low-drift odometry and mapping using range measurements from a 3D laser scanner moving in six degrees of freedom (6-DOF). The method achieves both low-drift in motion estimation and low-computational complexity. Real-time performance is achieved by dividing the complex problem of Simultaneous Localization and Mapping (SLAM) into two algorithms. One algorithm performs odometry at a high-frequency but at low fidelity to estimate velocity of the laser scanner. A second algorithm (mapping) runs at an order of magnitude lower frequency for fine matching and registration of the point cloud. The mapping algorithm is called only once per sweep, at a frequency of around 1 Hz, i.e. fine matching and registration are performed only once per sweep. The odometry algorithm operates estimates the motion of the lidar between consecutive sweeps, and operates at a higher frequency of around 10 Hz, implying that the motion estimate from odometry is updated multiple times over the course of an individual sweep. The motion estimate from odometry is used to untwist the component point cloud $P_k$ captured in each sweep k prior to the mapping step. The mapping algorithm is initialized using the odometry output from the previous sweep.

SUMMARY

The principles of Zhang’s odometry and mapping steps are broadly similar to each other. Both use “feature points” of a current point cloud $P_k$, and seek to match feature points in a current component point cloud $P_k$ to features captured earlier, and iterative estimate a lidar pose change that optimizes distances between the current feature points and the earlier features. However, whereas the mapping step looks for correspondences between the current point cloud $P_k$ and the accumulated point cloud data (i.e. the lidar map as it currently stand) to register in world coordinates, the odometry step only considers correspondences between $P_k$ and the component point cloud $P_{k-1}$ from the previous sweep $k-1$ to provide a relatively coarse motion estimation that is used to untwist $P_k$ and initialize the optimization of the mapping algorithm. In Zhang, the feature points are points classified as surface or edge based on local smoothness, but the techniques herein can be extended to other feature types.

A compromise made by Zhang to achieve real-time performance is to perform the mapping algorithm, which is significantly more expensive than the odometry algorithm in terms of computing resources, only once per sweep. This has a consequent accuracy penalty in the final lidar map. To some extent, it is possible to offset this accuracy penalty within the framework taught in Zhang, by improving the accuracy of the odometry motion estimation that initializes the mapping algorithm (that is, the accuracy penalty that comes from the lower frequency of mapping can, to some extent, be offset by improving the accuracy of the initialization). The odometry algorithm is a recursive non-linear optimization and the applicant's own tests have demonstrated that relatively "tight" convergence conditions are needed in the odometry stage to achieve the necessary level of odometry accuracy. However, this has its own latency penalty—because it means more recursions within each odometry recursion are needed to achieve the necessary level of convergence, and thus higher odometry latency.

The present disclosure provides an improved odometry mapping algorithm where each mapping step (recursion) can be completed in a significantly shorter amount of time, meaning the frequency of map updates, and hence the accuracy of the lidar map, can be increased significantly compared with Zhang whilst still achieving real-time performance. This, in turn, makes the lidar mapping less reliant on the initialization to achieve high accuracy mapping, i.e. higher mapping accuracy can be achieved, in real-time, with a lower accuracy initialization. The lower accuracy initiation could, for example, be derived via lidar odometry as in Zhang but with significantly less stringent convergence constraints (meaning lower odometry latency); however, the present techniques also make it viable to dispense with lidar odometry altogether because a sufficient initialization can be obtained e.g. from IMU (inertial measurement unit) measurements of the lidar alone, or can simply be set as some pre-determined value.

Using Zhang as a baseline, it is possible, for example, to implement the present techniques within that framework, but with the frequency of the mapping updates increased to match that of the odometry updates, whilst permitting much more aggressive early termination of the initial odometry step (e.g. using very few to zero iterations, particular when IMU measurements are available). This is because the odometry output need only be approximately correct so that it gives a plausible initialization (and untwisting) to be passed to the mapping step. As explained in the previous paragraph, this reduces the latency while also increasing mapping accuracy.

To achieve this increase in the speed at which mapping can be performed, one aspect herein uses a multithreading architecture.

A first aspect herein provides a computer-implemented method of updating an accumulated 3D map. A current point cloud is received, which is an untwisted lidar point cloud captured over a current interval, each point in the current point cloud associated with feature data indicating a feature type of each point of the current point cloud. Respective subsets of the current point cloud are provided to a plurality of processing threads. Each processing thread operates on its point cloud subset in parallel with the other processing thread(s) to perform the following mapping operations: compare each point of its point cloud subset with features of the accumulated 3D map to identify a corresponding feature of the same feature type in the accumulated 3D map, compute a distance between each point of its subset and the corresponding feature in the accumulated point cloud, and determine a derivative of each distance with respect to lidar pose change. The derivatives computed by the plurality of processing threads are used to: (i) calculate a refined pose change estimate over the current time interval, and (ii) augment the accumulated 3D map with the untwisted current point cloud using the refined pose change estimate.

With the present techniques, the emphasis of IMU and/or odometry shifts compared with Zhang. In Zhang, these are crucial both to provide untwisting and to initialize the lower frequency mapping. However, in the present context, the initialization is secondary. Generally speaking, some form of motion estimation will used to perform untwisting; whatever its source, that motion estimation can serve as a useful initialization to the mapping algorithm. However, that initialization is no longer critical and it would be possible to implement the present mapping techniques without such an initialization.

In embodiments, the final pose change estimate may be calculated in multiple mapping iterations. In each mapping iteration, each thread may perform at least said computing and determining operations of said mapping operations, and a refined pose change estimate may be calculated using the derivates computed by the plurality of processing threads in that mapping iteration. An initial mapping iteration may perform said mapping operations initially, each subsequent mapping iteration may perform at least said computing and determining operations of the mapping operations based on the refined pose change estimate from the previous mapping iteration, and the augmentation may be performed using the refined pose change estimate from a final mapping iteration.

The comparing operation may be equivalently referred to as determining correspondences (between the current feature points and corresponding features captured previously). The computing and determining operations compute distance and derivatives respectively. Some such embodiments use an "inner/outer loop" implementation, where the computing and determining operations may be performed in every iteration, but correspondences are not necessarily updated in every iteration.

In some such embodiments, the comparing operation may be performed in the initial mapping iteration but may not be performed in any subsequent mapping iteration, in which case each subsequent iteration may use the corresponding features computed in the initial mapping iteration. Alternatively, the comparing operation may be performed in one or some, but not all, of the subsequent mapping iterations, in which case the computing operation of each subsequent mapping iteration may use the most recently identified corresponding features.

The features of the accumulated point cloud may be stored in multiple data structures, each data structure storing features of a different feature type. Each data structure may be managed by a separate processing thread, which updates that data structure with new features as the lidar point cloud is accumulated.

For example, one set of hardware or software threads may perform the mapping operations in parallel, and another set of hardware or software threads may manage the multiple data structures.

Each data structure may be a KD-tree.

The current point cloud may be untwisted based on an initial pose change estimate over the current interval.

The initial mapping iteration may perform the mapping operations based on the initial pose change estimate.

The initial pose change estimate may be obtained using lidar odometry.

The lidar odometry may be supplemented with a set of associated IMU measurements obtained in the current interval.

The lidar odometry may comprise the following odometry operations: comparing each point of the current point cloud with a previous point cloud captured in a previous interval to identify a corresponding feature of the same feature type in the previous point cloud, computing a distance between each point in the current point and the corresponding feature in the previous point cloud, and computing a derivative of each distance with respect to lidar pose change, the derivatives used to compute the initial pose change estimate.

The initial pose change estimate may be calculated in multiple odometry iterations. In each odometry iteration, at least the computing and determining operations of the mapping operations may be performed, and an updated coarse pose change estimate may be calculated using the derivates computed in that odometry iteration. An initial odometry iteration may perform said computing and determining operations based on an initial coarse pose change estimate, and each subsequent odometry iteration may perform said odometry operations based on the coarse pose change estimate from the previous odometry iteration, the initial pose change estimate (to which the mapping operations are applied) being the coarse pose change estimate from a final odometry iteration.

The initial coarse pose change estimate may be derived from associated IMU measurements, or predetermined and not derived through measurement.

The odometry iterations may also distributed across multiple processing threads, with each of the multiple processing threads applying said odometry operations to a subset of the current point cloud allocated thereto.

As an alternative to odometry, the initial pose change estimate may be obtained using IMU measurements obtained in the current interval, without the use of lidar odometry, or predetermined and not derived though measurement.

The steps of the method may be performed multiple times per lidar scan, the current interval being less than the time taken to complete a lidar scan, whereby the accumulated point cloud is augmented multiple times per lidar sweep.

The feature data associated with each point may comprise a smoothness value for the point, which is used to separate points into edge and surface feature types.

A second aspect herein provides a computer system comprising: an input configured to receive a current point cloud; one or more processors configured to implement the steps of any preceding claim, the one or more processors configured to provide multiple hardware or software processing threads configured to implement the mapping operations.

The one more processors may be configured to provide a second set of software or hardware processing threads configured to implement the above odometry operations.

Alternatively or additionally, the one more processors may be configured to provide a second or third set of software or hardware processing threads configured to manage the multiple data structures referred to above.

A third aspect herein provides a computer program configured to program the computer system to implement the method of the first aspect or any embodiment thereof.

BRIEF DESCRIPTION OF FIGURES

For a better understanding of the present disclosure, and to show how embodiments of the same may be carried into effect, reference is made by way of example only to the following figures, in which:

FIG. 2 shows a schematic block diagram of a multithreading architecture that may be used to implement both an odometry algorithm and a mapping algorithm.

DETAILED DESCRIPTION

Figure 1:
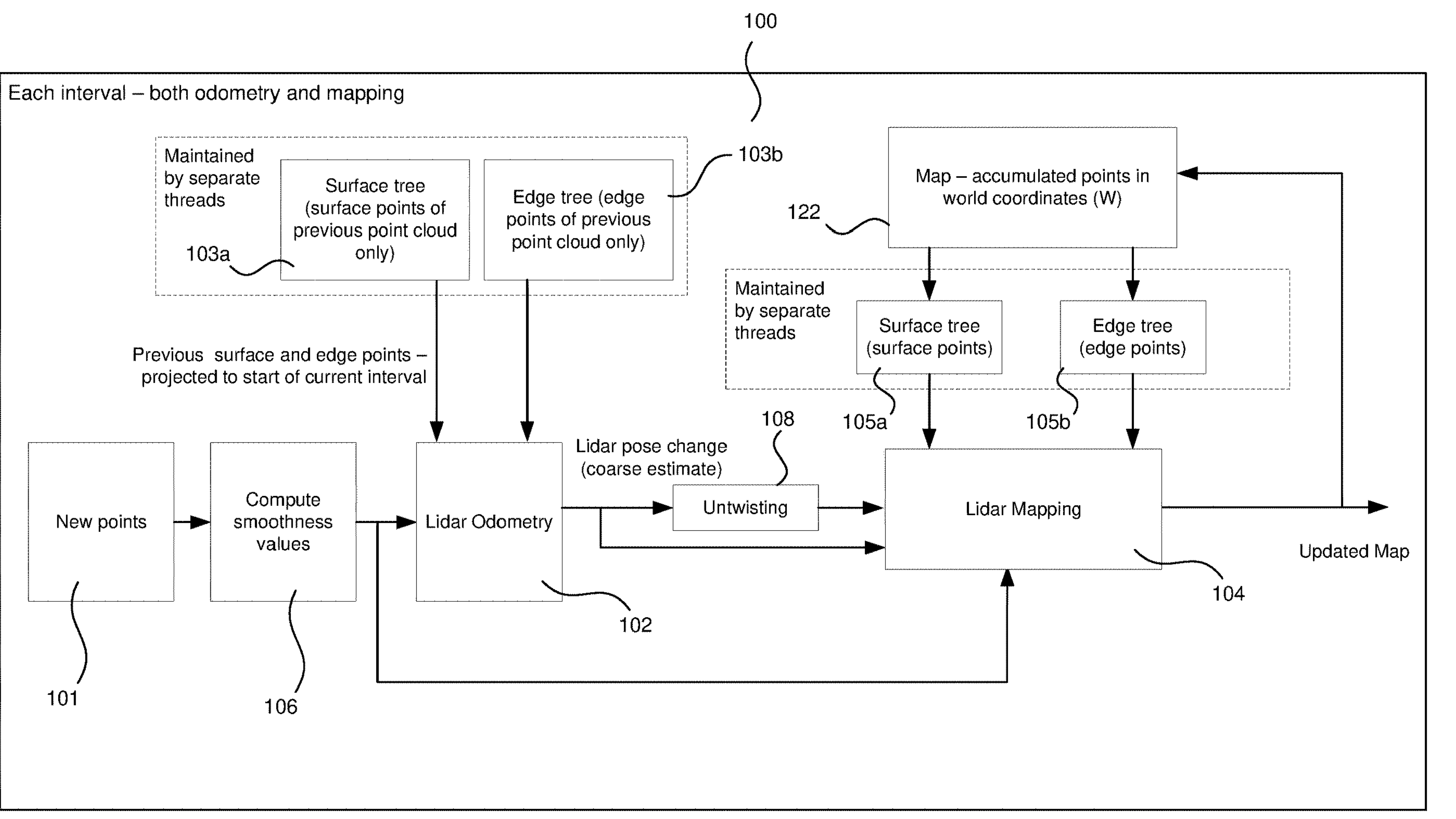
FIG. 1 shows a schematic function block diagram of a lidar mapping system.

FIG. 1 shows a schematic function block diagram of a lidar mapping system 100. The system 100 is shown to comprise an odometry component 102 and a mapping component 104, which implement lidar odometry and mapping algorithms respectively. In the described examples, the odometry and mapping algorithms operate as taught in Zhang, subject to the modifications set out in detail below.

As in Zhang, the odometry algorithm estimates velocity of a lidar scanner moving through an environment, with an IMU optionally providing a motion prior and helping to account for gross, high-frequency motion. This is used to perform untwisting of a current point cloud $P_k$. The mapping algorithm provides matching and registration of the point cloud in a "world" or "global" coordinate system W.

Following the notation of Zhang, $P_k$ represents a current set of lidar points, as captured in sweep k (component point cloud). The set $P_k$ is not static; it begins empty and grows over the course of the sweep k. Both odometry and mapping are applied multiple times to $P_k$ as it grows. The following description refers to this as performing multiple "recursions" of the odometry and mapping algorithms per sweep k. New points that are added to $P_k$ between sequential recursions are denoted by reference numeral 101.

This assumes a sweeping lidar, i.e. with period sweeping in the direction perpendicular to the lidar scan plane. However, set out in Zhang, the techniques can be applied to other forms of lidar scanner, such as multi-channel lidar.

Still following the notation of Zhang, $$T_k^C(t)$$

denotes a lidar pose change (transformation) that projects a point received at time t to a particular coordinate system C. Here, time t is a time within a current sweep k, i.e. $t \in [t_k, t_{k+1}]$ where $t_k$ is the start time of sweep k (and the end time of the previous sweep k−1) and $t_{k+1}$ is the end time of the current sweep k (and the start time of the next sweep k+1).

The coordinate system of the lidar scanner at time $t_k$ (the start of the current sweep and the end of the previous sweep) is denoted L, and $$T_k^L(t)$$

thus denotes a lidar pose change between $[t_k, t]$. The coordinate system L may be referred to as a local coordinate system. The transformation $$T_k^L(t)$$

is said to project a point captured a time t to the start of the current sweep/the end of the previous sweep $t_k$.

An accumulated 3D map 122 is defined in the world coordinate system W. The map 122 is generated by registering the component point clouds over multiple sweeps in the world coordinate system W, where $$T_k^W(t)$$

denotes a transformation projecting a point received at time t into the world coordinate system W.

A recursion of the odometry algorithm applied at time t means the odometry algorithm applied to $P_k$ when it contains the points received in the interval $[t_k, t]$, in order to estimate the lidar pose change $$T_k^L(t)$$

over the course of that interval. Likewise, a recursion of the mapping algorithm applied at time t means the mapping algorithm applied to $P_k$ when it contains the points received in the interval $[t_k, t]$, in order to estimate the transformation $$T_k^W(t)$$

to the world coordinate system W (local-to-global transformation).

Each recursion is iterative—in any given recursion of the odometry algorithm, $$T_k^L(t)$$

may be iteratively updated before a final estimate of $$T_k^L(t)$$

is returned at the end of that recursion.

Likewise, in any given recursion of the mapping algorithm, $$T_k^W(t)$$

may be iteratively updated before a final estimate of $$T_k^W(t)$$

is returned. Unless otherwise indicated, in the following description, the term “final” refers to the estimate of the relevant transformation returned at the end of a particular recursion of the algorithm in question (i.e. as computed in the final iteration of that recursion).

Each of the aforementioned transformations can be represented in terms of a change in 6D pose (3D space and 3D orientation), and will depend on changes in the pose (location and/or orientation) of the lidar scanner as the points are captured.

In contrast to Zhang, in the described examples, the odometry and mapping algorithms are applied recursively at the same frequency (i.e. to generate final estimates of the local and global transformations at that frequency), and odometry is implemented with less stringent convergence conditions to provide faster convergence. As explained above, it is possible to relax the odometry convergence constraints because the increased mapping frequency reduces the reliance on the initialization from odometry. This, in turn, reduces odometry latency.

The ability to increase the frequency at which mapping is performed, whilst maintaining real-time performance, stems from the use of a novel multi-threading architecture that parallelizes certain computationally expensive mapping operations. In fact, in the following examples, both odometry and mapping are parallelized in a similar manner to achieve optimal performance. Whilst both odometry and mapping can benefit from the described parallelisation architecture, it is generally expected that the greatest performance benefit will be realised though parallelization of the lidar mapping algorithm because the relevant mapping operations are generally more computationally intensive than the corresponding odometry operations.

In Zang, the odometry algorithm is called multiple times per sweep, in order to provide multiple pose change estimates per sweep.

Whilst in Zang, the mapping algorithm is called only once per sweep using the odometry output from the previous sweep as initialization, herein, the lidar mapping algorithm is called multiple times per sweep at the same frequency as the odometry algorithm.

Both the odometry and mapping algorithms extract feature points located on edges and planar surfaces and match the feature points to edge-line segments and planar surface patches, respectively, based on distance gradients (in the form of Jacobians). The steps of the two algorithms are essentially the same as each other, but differ in the following respects.

Firstly, the odometry algorithm matches feature points of the current point cloud $P_k$ to the previous point cloud $P_{k-1}$ only, whereas the mapping algorithm matches current feature point to the accumulated 3D map 122.

Secondly, the mapping algorithm is applied with a larger number of feature points than the odometry algorithm.

Thirdly, the odometry algorithm has less restrictive convergence constraints than the mapping algorithm.

A feature extractor 106 computes a smoothness value c of each new point 101 of the current point cloud $P_k$ as per Equation (1) of Zhang. The smoothness value c takes into account other points received in the same scan. The smoothness value c takes into account variations in the 3D locations of points captured in the same scan in order to quantify local 3D surface smoothness. As in Zhang, the smoothness values are used to select feature points of different feature types—specifically, surface points (smoothness above an applicable surface threshold) and edge points (smoothness below an applicable edge threshold). Different thresholds are used to select and edge feature points for odometry and mapping, with the result that, for the most part, more surface and edge feature points are used in mapping that odometry.

As in Zhang, KD-tree data structures are used to represent previous points to allow correspondences to be determined efficiently. Specifically, first KD-trees 103*a*, 103*b* are used to efficiently represent relevant 3D features of the previous point cloud $P_{k-1}$ for the purpose of odometry, and second KD-trees 105*a*, 105*b* are used to represent relevant 3D features of the accumulated 3D map 122 for the purpose of mapping.

One novel aspect of the present system is that separate KD trees are used to represent surfaces and edges. For odometry, a first surface KD tree 103*a* and a first edge KD tree 103*b* are used to represent surface and edge structure, respectively, of the previous point c loud $P_{k-1}$. For mapping, a second surface tree1 105*a* and a second edge tree 105*b* are used to represent surface and edges structure, respectively, of the accumulated 3D map 122.

This, in turn, means that separate parallel threads can be used to maintain the surface and edge trees. In the present example, four separate threads are used, each of which maintains a different one of the four KD trees 103*a*, 103*b*, 105*a*, 105*b*. Each thread maintains its respective KD tree by updating it between odometry and mapping recursions with relevant features as applicable. This follows the principles taught in Zhang, but with the modification that one tree is used per feature type, with the operations distributed accords multiple parallel threads according to feature type. Note, this is an additional layer of parallelization, separate from the parallelization of the odometry and mapping components 102, 104, as will now be described.

A second novel aspect of the present system also stems from multithreading, to parallelize the odometry and mapping component 102, 104.

FIG. 2 shows a multithreading architecture that can be used to implement both the odometry component 102 and the mapping component 104.

In order to select surface points and edge points of the current point cloud $P_k$, the points are ordered by smoothness values, by an ordering component 202. Points in between the applicable surface and edge thresholds, which are neither surface nor edge points, are ignored by the applicable algorithm. Although not depicted in FIG. 2, as noted above, different thresholds are implemented for odometry and mapping, so that, in general, more surface and edge points are selected for mapping (so, generally, fewer points are ignored in mapping).

The algorithm is then applied to the selected surface and edge points in a distributed manner, by multiple parallel processing threads 204 (these are separate from the threads used to maintain the KD trees 103*a*, 103*b*, 105*a*, 105*b* of FIG. 1). Two processing threads 204 are shown in FIG. 2 by way of example, but it will be appreciated that the following principles can be applied with more threads to achieve a greater extent of parallelization.

Reference numeral 204*n* denotes an arbitrary one of the multiple processing threads 204 (thread n), and the description of the thread 204*n* applies to each of the multiple processing threads 204.

Each thread 204*n* is allocated a mixture of surface and edge points. This provides optimal load balancing between the threads 204. Typically, the processing and matching of edge points is more computationally intensive than surface points, so this allocation distributes the computational work more evenly between the threads 204.

The subset of surface and edge points allocated to the thread 204*n* are denoted by reference numerals 101*a* and 101*b* respectively.

The thread 204*n* is programmed to implement the following components.

A surface matching component 220*a* matches each of the surface points 101*a* to corresponding surface features of an applicable surface KD-tree 213 (the first surface tree 103*a* for odometry, and the second surface three 105*a* for mapping). This may also be referred to as determining correspondences between the surface points 101*a* and the surface tree 213. A surface distance computation component 222*a* computes distances between the edge points 101*a* and the corresponding surface features of the surface tree 213.

Similarly, an edge matching component 220*b* matches each of the edge points 101*b* to edge features of an applicable surface KD-tree 215 (the first edge tree 103*b* for odometry, and the second edge tree 105*b* for mapping). This may also be referred to as determining correspondences between the edge points 101*b* and the edge tree 215. An edge distance computation component 222*b* computes distances between the surface points 101*b* and the corresponding surface features of the edge tree 215.

As taught in Zhang, the surface and edge matching, and distance computations, are based on a current pose change estimate $$T_k^C(t) \text{ (where } C = L$$

for odometry, and C=W for mapping). This is an estimate of the lidar pose change since the previous recursion of the algorithm, in the applicable coordinate system.

For odometry, $$T_k^L(t)$$

can be initialized to zero, and is updated iteratively based on distance optimization. For mapping, $$T_k^W(t)$$

can be initialized using the final pose change estimate from the corresponding odometry recursion, and updated from there.

Where useful to distinguish between odometry and mapping, the term "coarse pose change estimate" may be used to refer to $$T_k^L(t)$$

as updated iteratively in odometry, and "refined pose change estimate" may be used to refer to $$T_k^W(t)$$

as updated iteratively in mapping.

A derivate component 224 computes a derivate of the surface and edge distances with respect to $$T_k^L(t),$$

in the form Jacobeans. The aforementioned components 220*a*, 222*a*, 220*b*, 2226, 224 operate as per Equations (2) to (9) of Zhang.

Note, the derivative component 224 computes a subset of distance derivatives for the subset of feature points 101*a*, 101*b* assigned to that thread 204*n* only. A pose update component 226 receives the distance derivatives computed from all of the processing threads 204, and uses them to compute an updated pose change estimate, as per Equation (10) of Zhang. That is, letting J denote a Jacobian matrix formed by aggregating the Jacobeans computed by all of the threads 204, and d denote a vector of the surface and edge distances computed by all of the threads 204, the pose is updated as:

$$T_k^C(t) \leftarrow T_k^C(t) - \left(J^T J + \lambda \text{ diag }(J^T J)\right)^{-1} J^T d.$$

This multithreading recognizes that the individual components of the Jacobean J and the distances d can be computed separately, and leverages this insight to distribute the computation of the distances and the Jacobeans across the multiple threads 204. The pose update component 226 is said to "stack" the distances and derivates from all of the threads 204 to enable it to carry out the above update, as per the teaching of Zhang.

The above operations constitute one iteration of the relevant algorithm (odometry or mapping). Having computed the updated pose, a determination is made as to whether an applicable set of convergence criteria is met; if not, a further iteration of the above operations is performed, with the updated pose being fed back to the threads, to repeat the distance and Jacobean computations based on the updated pose. This continues until the updated pose $$T_k^C(t)$$

satisfies defined convergence criteria (or some other termination condition is met, such as a maximum number of iterations).

The surface matching and edge matching operations do not need to be re-performed every iteration. Acceptable accuracy can be achieved by updating the correspondences in only a subset of the iterations. An iteration in which the correspondences are updated, by components 220*a* and 220*b*, may be referred to as an "outer loop", whilst an iteration in which the distances and derivatives are updated without first updating the correspondences (and instead using the most recent correspondences as determined in an earlier recursion of the algorithm) may be referred to as an "inner loop". This inner loop/outer loop implementation has material benefits in increased efficiency (because updating the correspondences is relatively computationally expensive), whilst still providing an acceptable level of accuracy.

Returning to FIG. 1, the final local pose change estimate $$T_k^L(t)$$

computed by odometry is used to untwist the current point cloud $P_k$, by the untwisting component 108, prior to mapping. This is referred to in Zhang as projecting the point of $P_k$ to the start of the current sweep k. In Zhang, untwisting is only performed at the end of the sweep, because mapping is only applied once per sweep. Here, mapping is performed multiple times per sweep at the same frequency as odometry, and untwisting may be performed at the end of every odometry recursion for that purpose.

The lidar mapping algorithm is applied to the untwisted point cloud. The final global pose change estimate $$T_k^W(t)$$

computed at the end of a given mapping recursion (i.e. in the final iteration thereof) is used to augment the 3D map 122 with the new points 101 captured since the previous recursion, i.e. to register the new points 101 in the world coordinate system W.

As noted, another benefit of the increased mapping frequency is that the initialization provided by odometry does not need to be as accurate. As discussed above, this means the convergence constraints in the odometry algorithm can be relaxed. When supplemented by IMU measurements, a consequence may be that very few repeat iterations (if any) may be required in the odometry stage.

With sufficiently accurate IMU measurement, it may be possible to dispense with odometry altogether. In this case, the odometry component 102 can be omitted, and the point cloud $P_k$ can be untwisting using the IMU measurement directly. The IMU measurements can also be used to initialize $$T_k^W(t)$$

directly.

Moreover, it may also be possible to dispense with both the IMU measurements and odometry altogether. In this case, $$T_k^W(t)$$

can be initialized to some suitable predetermined value (e.g. zero), and updated iteratively from there. That is to say, the frequency of the mapping algorithm can be increased to the extent that it does not require any measured initialization.

In the examples above, untwisting is performed using the odometry estimate (FIG. 1, 108). With sufficiently accurate IMU measurements, IMU measurement alone could be used to perform the untwisting. The output of the mapping component 104 is a refined lidar pose change estimate, which could optionally be used to refine the untwisting. The Applicant's tests have demonstrated that this further untwisting is not necessary in many practical applications. However, as noted, a benefit of the techniques is that high accuracy lidar mapping can be performed with a lower quality initialization, or even no initialization at all. In that case, untwisting can be usefully performed using the refined lidar pose change computed in mapping (e.g. iterative untwisting as that estimate is refined).

In the above examples, the 3D map 122 takes the form of an accumulated point cloud, with KD-trees used to represent relevant features in the previous point cloud $P_{k-1}$ and the 3D map 122 for efficiently determining correspondences in odometry and mapping respectively. However, other data structures can be used for any of those purposes. For example, the accumulated 3D map 122 could be some other 3D structure built up over time by accumulating point cloud data. For example, the 3D map could take the form of a signed distance field (SDF), a voxel model, a surface mesh model etc, that is updated over time using the lidar point cloud data. Moreover, KD trees are merely one example of suitable data structures that facilitate efficient determination of correspondences and other data structures can be used to store recent features for this purpose.

The various components of FIGS. 1 and 2, including but not limited to the lidar and odometry components 102, 104 and the components shown to be implemented within the thread 204*n* of FIG. 2, are functional components representing functions that a computer system (comprising one or more computers) has been programmed to implement.

Herein, a thread can be a hardware thread or a software thread. A hardware thread is a physical processor or processor core (e.g. CPU or CPU core). This applied to the threads of FIG. 1 that manage the trees 103*a*, 103*b*, 105*a*, 105*b* and the multiple threads 204 in FIG. 2 over which the relevant algorithm (odometry or mapping) is distributed. A software thread may also be referred to as a "virtual core" refers to parallel processing implemented by the operating system, but using the same processor hardware, managed by an operating system (OS). Multiple software threads (virtual cores) can be implemented in a single hardware thread (physical processor or core). Using an increased number of hardware threads (physical cores) has the potential to provide greater efficiency, but efficiency benefits can also be realized using software threads. One example of a suitable architecture comprises multiple hardware threads, each providing one or more software threads. In that case, parallelization is achieved at the hardware level, by implementing the architecture of FIG. 2 across the multiple hardware threads, and additional parallelization might be implemented at the OS level in the case that each hardware thread provides multiple software threads. With software threads, often a role of the OS is to abstract away from the underlying hardware implementation to provide optimal efficiency. In this context, the use of multiple software threads gives the OS the freedom to optimize the distribution of processing within the underlying hardware.

Possible applications of the present techniques include robotics, and autonomous vehicles (AVs) in particular. For example, lidar mapping may be (one of the) mechanism(s) by which an autonomous vehicle or other mobile robot senses its environment. An autonomous vehicle (AV), also known as a self-driving vehicle, refers to a vehicle which has a sensor system for monitoring its external environment and a control system that is capable of making and implementing driving decisions automatically. Other mobile robots are being developed, for example for carrying freight supplies in internal and external industrial zones. Such mobile robots would have no people on board and belong to a class of mobile robot termed UAV (unmanned autonomous vehicle). Autonomous air mobile robots (drones) are also being developed. In a mobile robot context, lidar mapping can be used to enable a mobile robot to build up a 3D map of its environment in real-time. The present techniques could also be implemented in simulation, e.g. for the purpose of testing and/or training components. In this context, the techniques could be applied to simulated or synthetic point data generated using suitable sensor models.

Another application is augmented/mixed reality, e.g. to provide 3D mapping of an environment in order to overlay computer-generated imagery onto a real world view. A lidar-equipped user device could be used for this purpose, such as a modern smartphone, tablet or similar device, or a wearable headset etc.

Whilst a benefit of the present techniques is that they admit real-time implementation, the techniques taught herein are not limited to real-time applications. For example, the techniques can be applied in an offline context, and there can still be material speed and performance benefits to the multi-threading architecture in that context. One such application would be to aggregate large amounts of lidar point cloud data captured from, say, multiple lidar-equipped vehicles over a relatively long period of time. An aim in this context might be to build up a large and/or high-density 3D map of a particular area. This is not a real-time application, but may require the processing of very large amounts of data offline. In this context, the speed and performance benefits of the multi-threading architecture are also highly significant.

The invention claimed is:

1. A computer-implemented method of updating an accumulated 3D map for use in a mobile robot, the computer-implemented method comprising steps of:

receiving a current point cloud, which is an untwisted lidar point cloud captured over a current interval, each point in the current point cloud associated with feature data indicating a feature type of each point of the current point cloud, wherein an untwisted lidar point cloud is a lidar point cloud transformed to counteract ego motion effects by projecting the lidar point cloud to a particular time instant;

providing respective subsets of the current point cloud to a plurality of processing threads, wherein each processing thread of the plurality of processing threads operates on its point cloud subset in parallel with the other processing thread(s) of the plurality of processing threads to perform mapping operations including:

comparing the feature type of each point of its point cloud subset with features of the accumulated 3D map to identify a corresponding feature of a same feature type in the accumulated 3D map, computing a distance between each point of its subset and the identified corresponding feature in the accumulated 3D map, and determining a derivative of each distance with respect to lidar pose change; and using the derivatives computed by each processing thread of the plurality of processing threads to:

(i) calculate a refined pose change estimate over the current time interval, and (ii) augment the accumulated 3D map with the current point cloud using the refined pose change estimate to produce an augmented accumulated 3D map of an environment of the mobile robot.

2. The method of claim 1, wherein a final pose change estimate is calculated in multiple mapping iterations;

wherein, in each mapping iteration, each thread performs at least said computing and determining operations of said mapping operations, and a refined pose change estimate is calculated using the derivates computed by the plurality of processing threads in that mapping iteration, wherein:

an initial mapping iteration performs said mapping operations initially, each subsequent mapping iteration performs at least said computing and determining operations of the mapping operations based on the refined pose change estimate from a previous mapping iteration, and said augmentation is performed using the refined pose change estimate from a final mapping iteration.

3. The method of claim 2, wherein said comparing operation is performed in the initial mapping iteration but:

is not performed in any subsequent mapping iteration, wherein each subsequent iteration uses the corresponding features computed in the initial mapping iteration, or is performed in one or some, but not all, of the subsequent mapping iterations, wherein said computing operation of each subsequent mapping iteration uses the most recently identified corresponding features.

4. The method of claim 1, wherein the features of an accumulated point cloud are stored in multiple data structures, each data structure storing features of a different feature type, wherein each data structure is managed by a separate processing thread, which updates that data structure with new features as the lidar point cloud is accumulated.

5. The method of claim 4, wherein each data structure is a KD-tree.

6. The method of claim 1, wherein the current point cloud is untwisted based on an initial pose change estimate over the current interval.

7. The method of claim 6, wherein:

a final pose change estimate is calculated in multiple mapping iterations;

in each mapping iteration, each thread performs at least said computing and determining operations of said mapping operations, and a refined pose change estimate is calculated using the derivates computed by the plurality of processing threads in that mapping iteration;

an initial mapping iteration performs said mapping operations initially, each subsequent mapping iteration performs at least said computing and determining operations of the mapping operations based on the refined pose change estimate from a previous mapping iteration, and said augmentation is performed using the refined pose change estimate from a final mapping iteration;

said comparing operation is performed in the initial mapping iteration but:

is not performed in any subsequent mapping iteration, wherein each subsequent iteration uses the corresponding features computed in the initial mapping iteration, or is performed in one or some, but not all, of the subsequent mapping iterations, wherein said computing operation of each subsequent mapping iteration uses the most recently identified corresponding features; and the initial mapping iteration performs the mapping operations based on the initial pose change estimate.

8. The method of claim 6, wherein the initial pose change estimate is obtained using lidar odometry, optionally supplemented with a set of associated IMU measurements obtained in the current interval.

9. The method of claim 8, wherein the lidar odometry comprises odometry operations including:

comparing each point of the current point cloud with a previous point cloud captured in a previous interval to identify a corresponding feature of the same feature type in the previous point cloud, computing a distance between each point in the current point and the corresponding feature in the previous point cloud, and computing a derivative of each distance with respect to lidar pose change, the derivatives used to compute the initial pose change estimate.

10. The method of claim 9, wherein the initial pose change estimate is calculated in multiple odometry iterations;

wherein, in each odometry iteration, at least said computing and determining operations of said mapping operations are performed, and an updated coarse pose change estimate is calculated using the derivates computed in that odometry iteration, wherein:

an initial odometry iteration performs said computing and determining operations based on an initial coarse pose change estimate, and each subsequent odometry iteration performs said odometry operations based on the coarse pose change estimate from a previous odometry iteration, the initial pose change estimate being the coarse pose change estimate from a final odometry iteration.

11. The method of claim 10, wherein the initial coarse pose change estimate is:

derived from associated IMU measurements, or predetermined and not derived through measurement.

12. The method of claim 10, wherein multiple odometry iterations are also distributed across multiple processing threads, with each of the multiple processing threads applying said odometry operations to a subset of the current point cloud allocated thereto.

13. The method of claim 6, wherein the initial pose change estimate is:

obtained using IMU measurements obtained in the current interval, without the use of lidar odometry, or predetermined and not derived though measurement.

14. The method of claim 4, wherein the steps are performed multiple times per lidar scan, the current interval being less than the time taken to complete a lidar scan, whereby the accumulated point cloud is augmented multiple times per lidar sweep.

15. The method of claim 1, wherein the feature data associated with each point comprises a smoothness value for the point, which is used to separate points into edge and surface feature types.

16. A computer system configured to produce an augmented accumulated 3D map of an environment of a mobile robot, the computer system comprising:

an input configured to receive a current point cloud, which is an untwisted lidar point cloud captured over a current interval, each point in the current point cloud associated with feature data indicating a feature type of each point of the current point cloud, wherein an untwisted lidar point cloud is a lidar point cloud transformed to counteract ego motion effects by projecting the lidar point cloud to a particular time instant;

one or more processors configured to implement steps including:

providing respective subsets of the current point cloud to a plurality of processing threads, wherein each processing thread operates on its point cloud subset in parallel with other processing thread(s) of the plurality of processing threads to perform mapping operations including:

comparing each point of its point cloud subset with features of a first accumulated 3D map to identify a corresponding feature of a same feature type in the first accumulated 3D map, computing a distance between each point of its subset and the corresponding feature in the first accumulated 3D map, and determining a derivative of each distance with respect to lidar pose change; and using the derivatives computed by the plurality of processing threads to:

(i) calculate a refined pose change estimate over the current time interval, and (ii) augment the first accumulated 3D map with the current point cloud using the refined pose change estimate to produce an augmented accumulated 3D map of an environment of the mobile robot;

the one or more processors configured to provide multiple hardware or software processing threads configured to implement the mapping operations.

17. The method of claim 12, wherein:

said odometry iterations are also distributed across multiple processing threads, with each of the multiple processing threads applying said odometry operations to a subset of the current point cloud allocated thereto; and one more processors are configured to provide a second set of software or hardware processing threads configured to implement the odometry operations.

18. The computer system of claim 16, wherein:

the features of an accumulated lidar point cloud are stored in multiple data structures, each data structure storing features of a different feature type, wherein each data structure is managed by a separate processing thread, which updates that data structure with new features as the lidar point cloud is accumulated and the one more processors are configured to provide a second or third set of software or hardware processing threads configured to manage the multiple data structures.

19. A non-transitory media embodying computer-readable instructions configured, upon execution on one or more processors, to produce an augmented accumulated 3D map of an environment of a mobile robot by:

receiving a current point cloud, which is an untwisted lidar point cloud captured over a current interval, each point in the current point cloud associated with feature data indicating a feature type of each point of the current point cloud, wherein an untwisted lidar point cloud is a lidar point cloud transformed to counteract ego motion effects by projecting the lidar point cloud to a particular time instant;

providing respective subsets of the current point cloud to a plurality of processing threads, wherein each processing thread operates on its point cloud subset in parallel with other processing thread(s) of the plurality pf processing threads to perform mapping operations including:

compare each point of its point cloud subset with features of a first accumulated 3D map to identify a corresponding feature of a same feature type in the first accumulated 3D map, compute a distance between each point of its subset and the corresponding feature in the accumulated lidar point cloud, and determine a derivative of each distance with respect to lidar pose change; and using the derivatives computed by the plurality of processing threads to:

(i) calculate a refined pose change estimate over the current time interval, and (ii) augment the first accumulated 3D map with the current point cloud using the refined pose change estimate to produce an augmented accumulated 3D map of an environment of the mobile robot.

20. The non-transitory media of claim 19, wherein a final pose change estimate is calculated in multiple mapping iterations;

wherein, in each mapping iteration, each thread performs at least said computing and determining operations of said mapping operations, and a refined pose change estimate is calculated using the derivates computed by the plurality of processing threads in that mapping iteration, wherein:

an initial mapping iteration performs said mapping operations initially, each subsequent mapping iteration performs at least said computing and determining operations of the mapping operations based on the refined pose change estimate from a previous mapping iteration, and said augmentation is performed using the refined pose change estimate from a final mapping iteration.

* * * * *